March 3, 1942.  F. BURNETT  2,275,100
GEAR FORMATION
Filed July 8, 1939
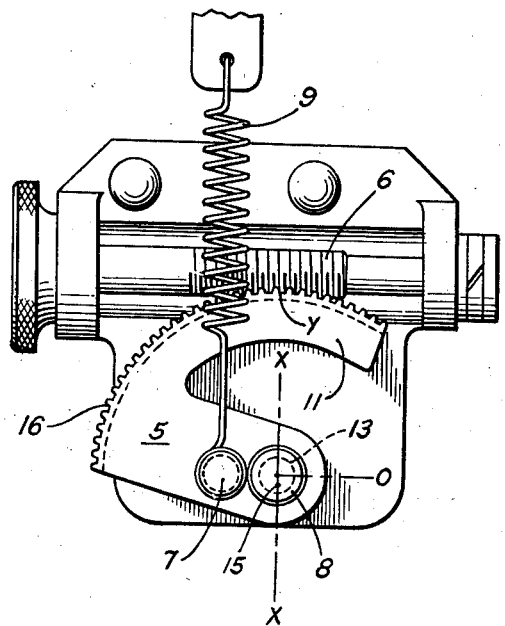
INVENTOR.
Frank Burnett
BY Martin J. Finnegan
ATTORNEY.

Patented Mar. 3, 1942

2,275,100

UNITED STATES PATENT OFFICE 2,275,100

GEAR FORMATION

Frank Burnett, East Orange, N. J., assignor to Bendix Aviation Corporation, South Bend, Ind., a corporation of Delaware Application July 8, 1939, Serial No. 283,491

2 Claims. (Cl. 74—440)

This invention relates to gear construction, and particularly to the formation of a gear adapted for use in adjustment devices which require maintenance of a firm substantially play-free, meshing relationship between the adjustment controlling elements.

In a fine-pitch worm and sector gearing of the character used for adjustment of the tension of a spring, for example, as exemplified in Figs. 5 and 6 of Patent No. 1,891,702 granted to Joseph W. Allen on December 20, 1932, it is very difficult to procure perfect meshing between the threads of the worm and the teeth of the fragmentary worm gear, or sector, which it actuates and holds in adjusted position. Machinery used in the commercial production of the threads on the screw and the corresponding teeth on the sector is capable of cutting these elements so that a fairly high standard of workability is obtained, but there are certain tolerances of dimensions that must be allowed, as in virtually all machine processes; the result is a lack of exact uniformity of parts, and hence a lack of perfect seating of the inter-engaged threads and teeth when the parts are assembled and subsequently used to perform their intended function. To the extent that the meshing is imperfect, there is a consequent danger that the associated parts will not retain the setting to which they have been adjusted. Furthermore such lack of uniformity makes it impossible to adopt a single rule of procedure which will be applicable to every unit of a series of such devices, as a criterion for the adjustment of the settings of such units.

It has occurred to me that those difficulties could be avoided by forming one of the inter-engaging gear elements—for example, the sector 60 of the Allen patent above identified—in such manner as to impart to the tooth portion thereof a tendency to move radially outward to an extent sufficient to cause an automatic take-up of any play or clearance between the teeth of one element and the teeth or threads of the part operatively associated therewith—for example, the screw 28 of the said Allen patent.

It is accordingly an object of the present invention to provide a novel method of assuring an automatic correction of the imperfections and inequalities in the tooth or thread characteristics of a pair of inter-meshed gear elements.

A second object is to provide a gear element of novel construction, adapting it for use in the elimination of the difficulties hereinabove outlined.

These and other objects of the invention will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claims for this purpose.

In the drawing reference character 5 designates a fine toothed sector constructed in accordance with the teaching of the present invention, and installed, after completion, in operative position upon a unit of the character shown in Figs. 5 and 6 of the Allen patent above identified; the sector 5 being adapted for meshing with the threads of an adjusting screw 6, and having a pin 7 secured thereto at a point spaced from the pivotal mounting pin 8, and adapted to receive one end of a spring 9 whose tension is to be adjusted by turning of the screw 6 and subsequently held in the adjusted position by reason of the locking effect of the inter-engaged threads and teeth of the screw and sector.

As shown, the sector 5 differs from that of the Allen patent in that a portion of the material between the pivot point "O" and the working portion of the toothed edge is cut away, leaving a narrow, arcuate arm 11, this cutting away being done preferably in advance of the cutting of the teeth along the arcuate surface so that after the completion of the tooth cutting, the inherent resiliency of the metal will tend to move the arm 11 radially outward into position of firm meshing relationship; however, it is not essential that this sequence be followed, as the arm 11 may be biased outwardly by any other suitable method. One such other method is to mount the sector, during the tooth cutting operation, to turn about an axis spaced away from the actual center "O" of the sector—that is, from the center of the drilled hole 13 by which the sector is subsequently mounted on the device in which it is to function—by an amount sufficient to provide a substantial eccentricity as between the pitch circle of the sector teeth and the arc which the sector describes as it turns about its bearing pin 8, in actual use. The offset axis is indicated at 15 in the drawing as being on a line X—X which includes the point "O" and leads toward the point (Y) where the tooth cutting tooth (hobber) engages the sector, in the process of cutting the successive teeth 16. Thus there is added to the inherent resiliency of the arm 11 (which may be accentuated by tempering the part after completion thereof) an additional factor to assure an automatic takeup of any clearance between the inter-engaging teeth and threads; but in certain uses of such gears this additional step of off-setting the axis of tooth formation may be dispensed with as unnecessary, particularly if the material is inherently sufficiently resilient so that arm 11 may be initially flexed or biased sufficiently to have the tendency to move outward into firmer meshing relationship.

What I claim is:

1. In a gear mechanism, the combination with a driving gear, of a driven gear having a hub portion whose axis of rotation is fixed, and a peripheral toothed portion integral with but movable radially of said hub portion by an amount sufficient to tend to hold said driven gear in firmer meshing relationship with said driving gear.

2. In a gear mechanism, in combination, a driving gear, a driven gear meshed therewith, said driven gear having a hub portion whose axis of rotation is fixed and a peripheral toothed portion integral with but movable radially of said hub portion by an amount sufficient to tend to hold said driven gear in firmer meshing relationship with said driving gear.

FRANK BURNETT.